United States Patent
Wilms

(10) Patent No.: US 6,942,283 B2
(45) Date of Patent: Sep. 13, 2005

(54) OPEN ROOF CONSTRUCTION FOR A VEHICLE

(75) Inventor: Bernd Wilms, Nettetal (DE)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 10/755,697

(22) Filed: Jan. 12, 2004

(65) Prior Publication Data

US 2004/0189056 A1 Sep. 30, 2004

(30) Foreign Application Priority Data

Jan. 29, 2003 (DE) .......................................... 103 03 474

(51) Int. Cl.[7] .................................................. B60J 7/00
(52) U.S. Cl. ..................................................... 296/213
(58) Field of Search .......................................... 296/213

(56) References Cited

U.S. PATENT DOCUMENTS

| 4,537,442 A | | 8/1985 | Jardin | 296/221 |
| 4,936,622 A | * | 6/1990 | Yamauchi et al. | 296/213 |
| 5,040,845 A | * | 8/1991 | Huyer | 296/222 |
| 5,718,472 A | * | 2/1998 | Otake et al. | 296/221 |
| 5,810,429 A | | 9/1998 | Jardin et al. | 296/214 |
| 6,073,994 A | | 6/2000 | Jardin et al. | 296/213 |

FOREIGN PATENT DOCUMENTS

| DE | 38 12 955 A1 | 11/1989 |
| GB | 2 314 050 A | 12/1997 |

* cited by examiner

*Primary Examiner*—Dennis H. Pedder
(74) *Attorney, Agent, or Firm*—Westman, Champlin & Kelly, P.A.; Todd R. Fronek

(57) ABSTRACT

An open roof construction for a vehicle having a roof opening in its fixed roof, includes a frame having longitudinal guide sections, and a closure moveable by a closure operating mechanism between a closed position and an open position in which the closure is slid under the fixed roof. A drain channel is positioned under the rear edge of the roof opening at least in a closed position of the closure and is movable with a drain channel operating mechanism, which is capable of moving the drain channel in the opening direction of the closure. The drain channel operating mechanism is adapted so as to cause a relative movement between the drain channel and the closure. The relative movement may be used to move the drain channel such that the drain channel occupies less space when the closure is at its fully opened position, which leads to a saving of space within the frame.

11 Claims, 4 Drawing Sheets

OPEN ROOF CONSTRUCTION FOR A VEHICLE

BACKGROUND OF THE INVENTION

The invention relates to an open roof construction or assembly for a vehicle.

Open roof constructions are known, for example from U.S. Pat. No. 4,537,442. This patent discloses an open roof construction of the tilt-slide type. When the roof opens by sliding the closure under the fixed roof, the drain channel under the rear edge of the roof opening is moved along with the closure, The object of the present invention is to further improve the prior art open roof construction.

SUMMARY OF THE INVENTION

An open roof construction or assembly for a vehicle having a roof opening in its fixed roof, includes a frame having longitudinal guide sections, and a closure moveable by a closure operating mechanism between a closed position and an open position in which the closure is slid under the fixed roof. A drain channel is positioned under the rear edge of the roof opening at least in a closed position of the closure and is movable with a drain channel operating mechanism, which is capable of moving the drain channel in the opening direction of the closure. The drain channel operating mechanism is adapted so as to cause a relative movement between the drain channel and the closure. The relative movement may be used to move the drain channel such that the drain channel occupies less space when the closure is at its fully opened position, which leads to a saving of space within the frame.

In one embodiment, the closure operating mechanism is connected to the drain channel operating mechanism by means of a lost motion device. The advantage of such a lost motion device is its simplicity and its reliability.

According to a further embodiment of the invention, the drain channel operating mechanism comprises a locking mechanism for locking the horizontal sliding movement of the drain channel relative to the guide section when the lost motion device is operative. In this manner, the locking mechanism guarantees the fixed horizontal position of the drain channel when the lost motion device causes the relative movement between the closure and the drain channel.

It is advantageous if the lost motion device enables both the relative movement of the closure and the drain channel and the horizontal sliding movement of the drain channel operating mechanism relative to the longitudinal guide sections of the frame. In this manner, the lost motion device combines two functions.

In more detail, said two combined functions can be achieved in a simple way in that the lost motion device comprises a connecting member including a slot with an inclined locking portion and wherein said locking mechanism includes a pin guided by the slot, such that when the pin is in the slot the locking mechanism is locked and the closure moves relative to the drain channel, and such that when the pin is in the locking portion, the locking mechanism has been unlocked and the closure and the drain channel have been locked relatively.

BRIEF DESCRIPTION OF THE DRAWINGS

The invention will be explained in more detail hereafter with reference to the drawings, which schematically show an embodiment of the invention.

DETAILED DESCRIPTION OF THE PREFERRED EMBODIMENTS

Figure 1A:
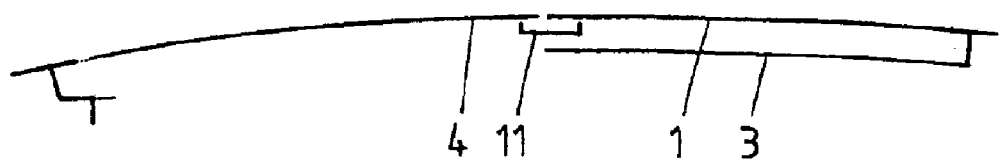
FIG. 1a–1e are very schematic side elevational views of the open roof construction according to the invention showing the principle movements of the closure and drain channel.
Figure 1B:
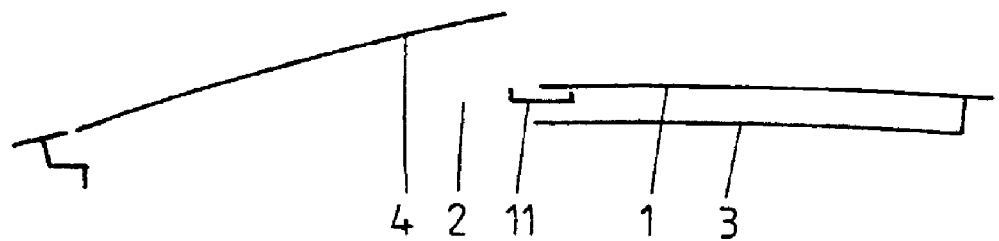
Figure 1C:
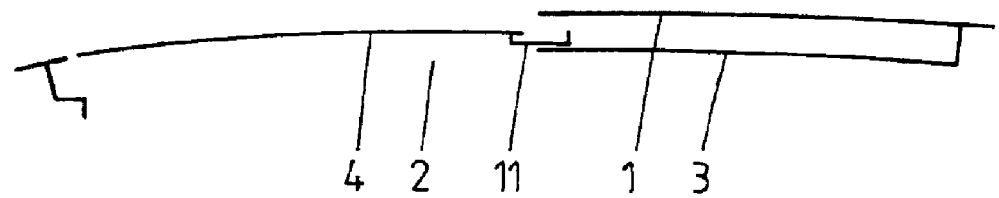
Figure 1D:
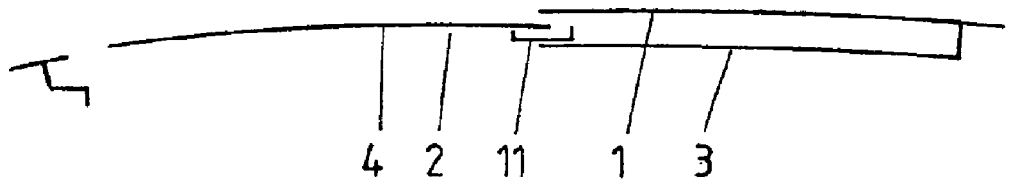
Figure 1E:
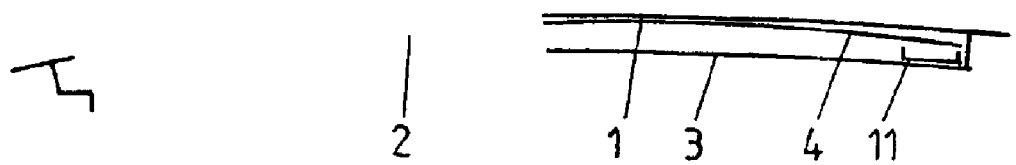

The Figures show an embodiment of the open roof construction or assembly according to the invention which is already built into a vehicle (in this case a passenger car) whose fixed roof 1 is provided with a roof opening 2. The open roof construction can include a frame 3 or other stationary part, which can be attached to or is part of the fixed roof 1. The frame 3 supports in a movable manner a closure 4. In the illustrated embodiment, the closure 4 is a rigid (transparent) panel, but may have other configurations or may include several parts. In the exemplary embodiment, the open roof construction is in a form of a so called tilt-sliding roof, wherein the closure 4 can be moved from the closed position (FIG. 1a) in a roof opening 2 both to a venting position (FIG. 1b) in which it slopes upwardly, and to a downwardly moved position (FIG. 1c) and subsequently to an open position moved rearwardly under the fixed roof 1 (FIG. 1e). In this detailed description only the downward and rearward movement of the closure under the fixed roof is set forth hereafter.

The movements of the closure 4 are obtained by means of a closure operating mechanism 5. In this embodiment, there are two closure operating mechanisms 5 on each longitudinal side of the closure 4, each being guided by a longitudinal guide section 6 mounted on or being part of the frame 3. Only one guide section 6 and related parts are shown in the drawing, but it should be kept in mind that the same parts are provided on the other side of the roof opening, although in mirror image.

An embodiment of this closure operating mechanism 5 is described in more detail in WO-A-00/06403 in the name of applicant. The disclosure thereof is incorporated herein by reference thereto. The closure operating mechanism 5 per se does not form part of the invention. Only some parts which have a connection to the invention will be described herein.

The closure operating mechanism 5 is driven by a drive cable 7 or other driving mechanism, which can be actuated, for example, by a manual or electric drive. The drive cable is connected to a driven slide 8 of the closure operating mechanism 5. The driven slide a is operatively connected to a curve slide 9, which is stationary during vertical movements of the closure 4, and which moves with the closure 4 during sliding movements thereof. It therefore has a fixed horizontal relationship with the closure 4.

The closure operating mechanism 5 is coupled in a manner to be described with a drain channel operating mechanism 10 movably supporting a drain channel 11.

This drain channel 11 is part of a water collecting and draining system of the open roof construction. The drain channel 11 is positioned under the rear edge of the closure 4 and the roof opening 2 in forward positions of the closure 4 in order to receive and discharge any water dripping off from said rear edge or seeping past a seal between the closure 4 and the fixed roof 1. The water received in the drain channel 11 is collected and discharged at its ends via a drain channel extension 12 into lateral longitudinal stationary drain channels equipped with drain pipes (not shows).

In order to enable the closure 4 to move rearwardly under the fixed roof 1, the drain channel 11 is movable by means of the drain channel operating mechanism 10. FIG. 1a–e very schematically show the movements of the drain channel 11. In the closed and venting positions of the closure 4 (FIGS. 1a and b) the drain channel 11 is positioned under the rear edge of the roof opening 2. When the closure 4 is moved downwardly in order to be slid rearwardly under the fixed roof 1, the drain channel 11 is also moved downwardly (FIG. 1c). According to this embodiment of the invention, the closure 4 starts moving rearwardly while the drain channel 11 is kept stationary, so that they move relatively to each other such that the drain channel 11 in one embodiment, does not protrude rearwardly beyond the closure 4 anymore (FIG. d). When this position is reached, the closure operating mechanism 5 and the drain channel operating mechanism 10 are coupled to form a unit, so that the closure 4 and the drain channel 11 are moved rearwardly as a unit (FIG. 1e).

Figure 2:
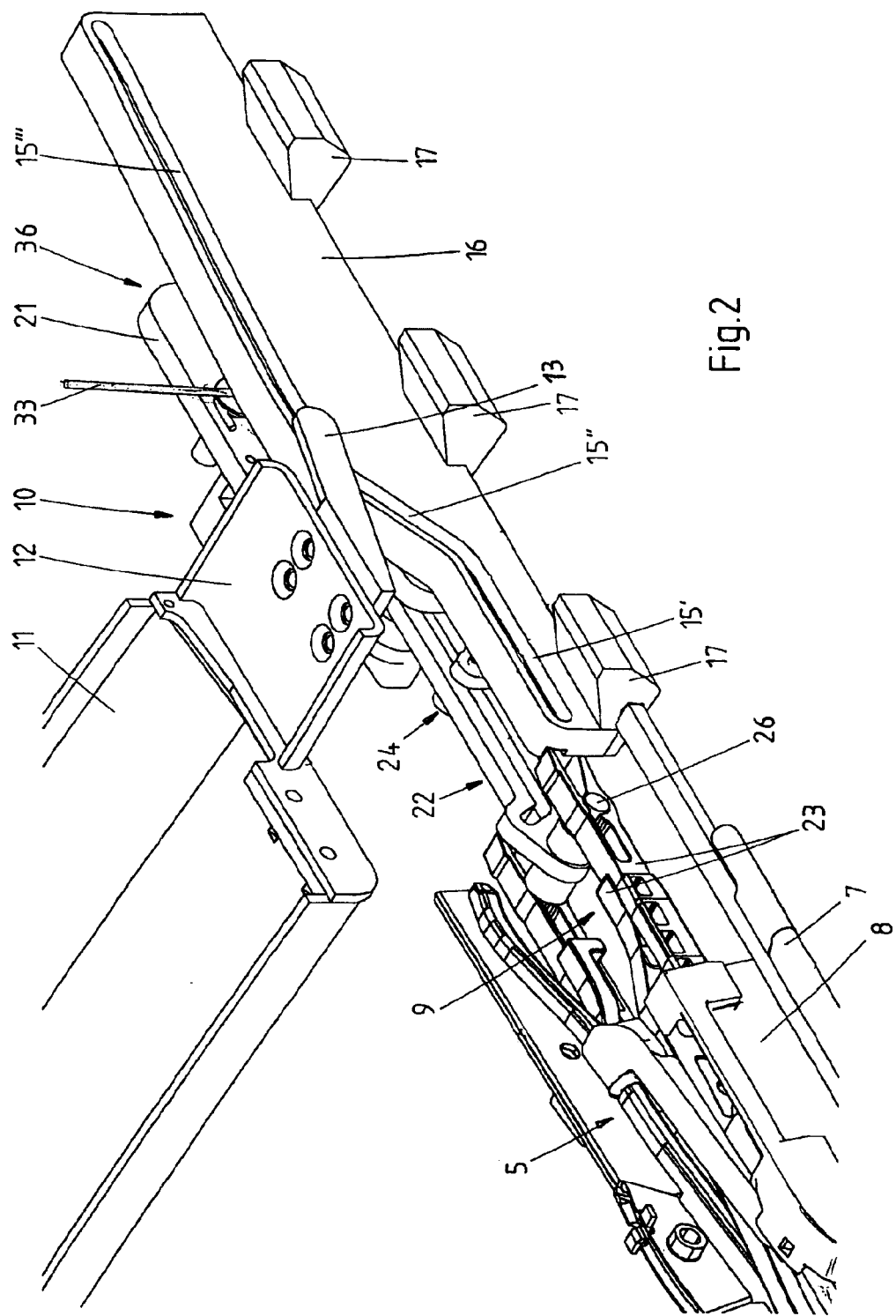
FIG. 2 is an enlarged side elevational view of an embodiment of the open roof construction according to FIG. 1.
Figure 3:
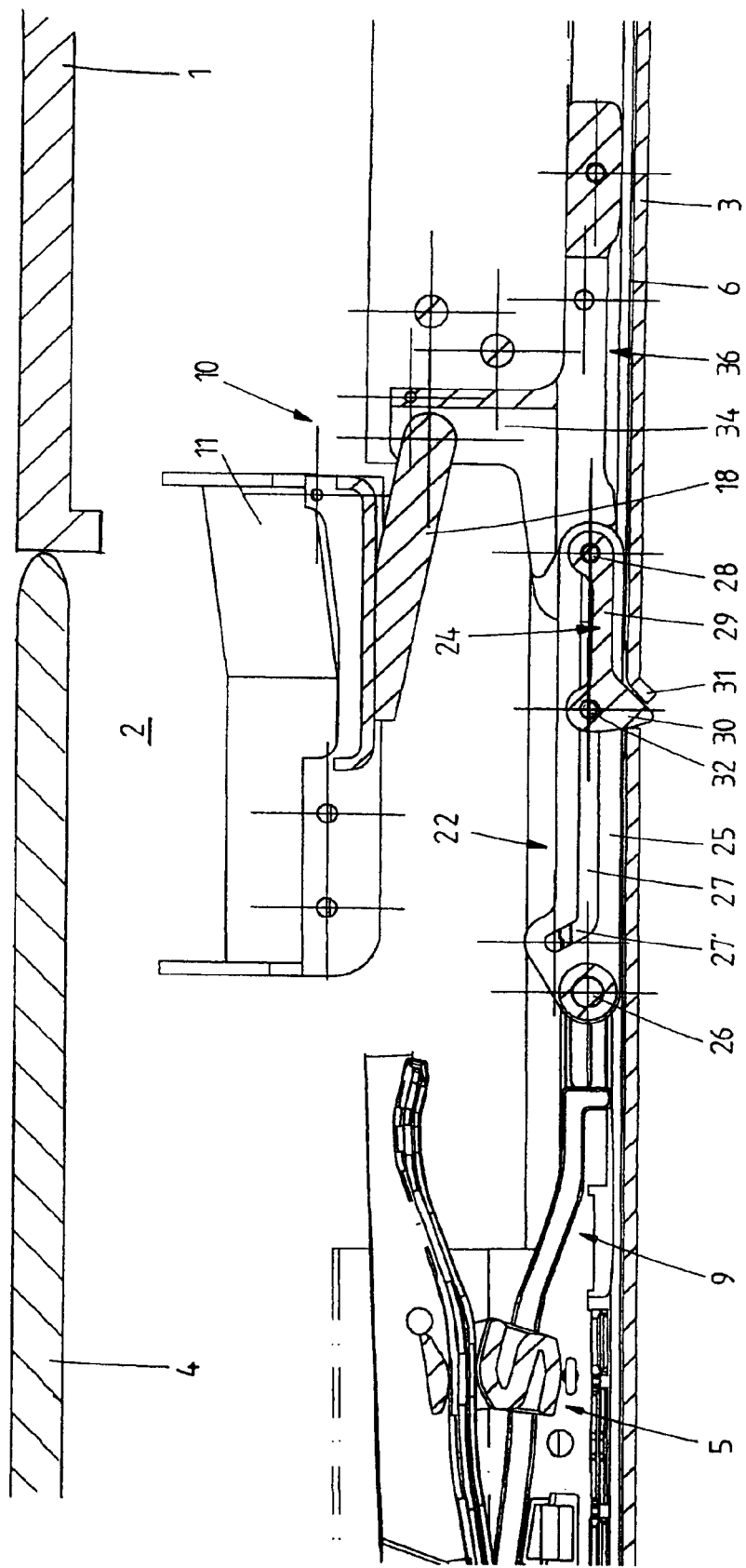
FIG. 3 is a cross sectional view of the open roof construction of FIG. 2, showing the drain channel operating mechanism.

In order to obtain such mode of operation, the drain channel operating mechanism 10 includes several parts. The drain channel 11 is supported through its extension 12 on a support member 13 attached on one end to the drain channel extension 12 and being provided with a slide pin 14 on the other end (FIG. 2). The slide pin 14 is slidably engaged in a guide curve 15 formed in a curve slide 16. The curve slide 16 is slidably supported in the guide section 6 by means of slide shoes 17 and is coupled to the drive cable 7. Due to this coupling, the curve slide 16 always follows the movements of the drive cable 7 upon each operation of the closure operating mechanism 5.

Referring to FIG. 2, the guide curve 15 includes three sections: a lower horizontal front section 15', an intermediate inclined section 15" and a rear higher horizontal section 15'''. When the slide pin 14 is in horizontal guide section 15' or 15''', the drain channel 11 is kept stationary upon operation of the closure 4, and the drain channel 11 is moved in vertical direction when the slide pin 14 is in the inclined section 15" of the guide curve 15.

Figure 4:
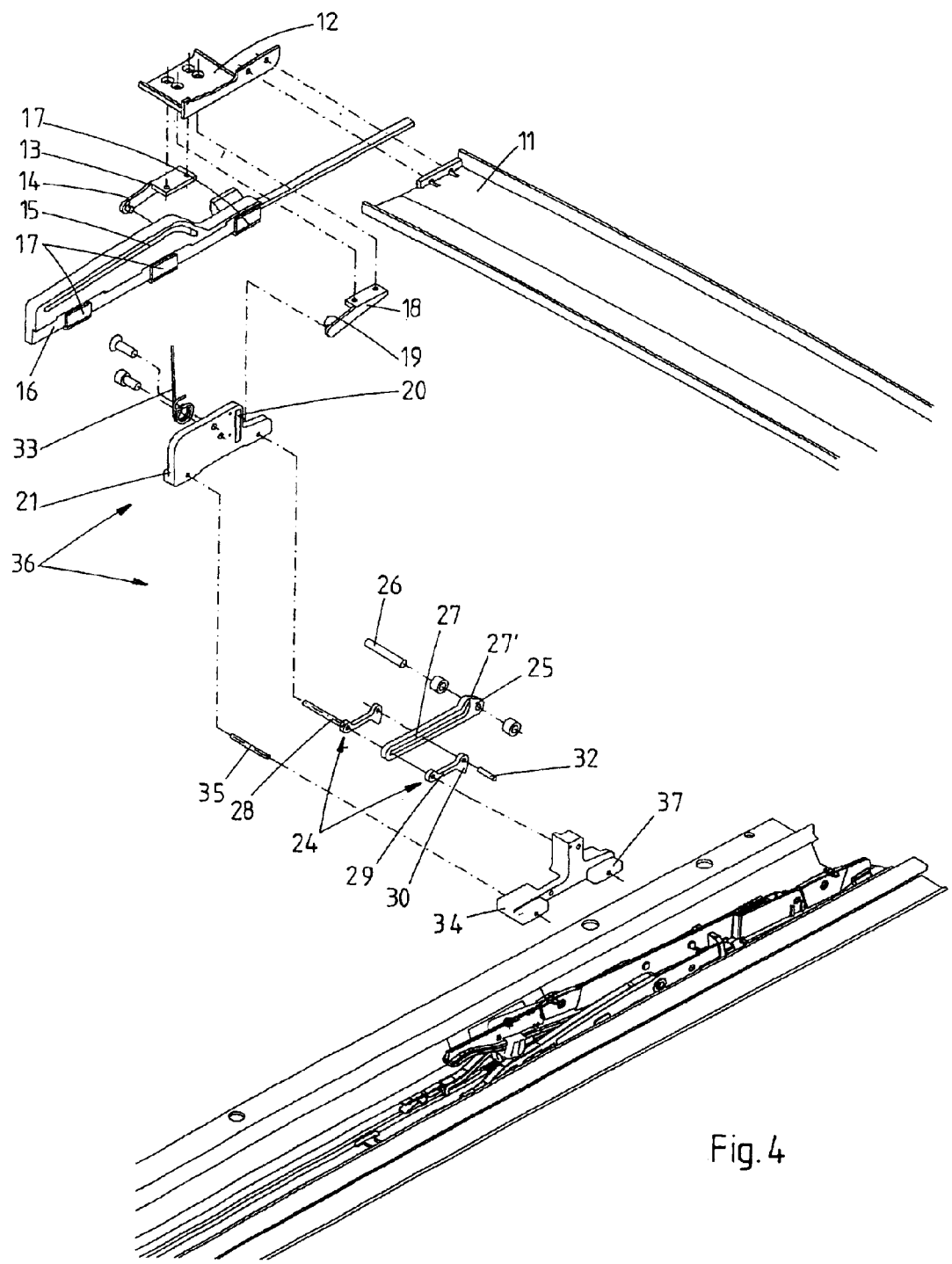
FIG. 4 is an exploded view of the mechanism shown in FIG. 3, wherein the parts of the mechanism are shown separately.

In order to prevent the drain channel 11 from moving along with the curve slide 16 in an undesired manner, the drain channel 11 includes a horizontal support member 18 attached on one end to the drain channel extension 12 and provided on the other end with a guide pin 19 engaging in a substantially vertical slot 20 provided in a slide member 21 (FIG. 4). Said slide member 21 is part of a slide 36 which further comprises a second slide member 34 which is connected to slide member 21 by means of two pins 28 and 35. Said slide 36 is guided by the guide section 6 by means of slide shoes 37. At the front end of slide 36 there is provided a lost motion device 22 between the slide members 21 and 34 in order to couple the slide 36 of the drain channel operating mechanism 10 to parts 23 of the curve slide 9 of the closure operating mechanism 5. The slide 36 of the drain channel operating mechanism 10 also comprises a locking mechanism 24 cooperating with the lost motion device 22.

The lost motion device 22 comprises a connecting member 25 attached at its front end to a transverse pin 26 at the rear end of the curve slide 9 of the closure operating mechanism 5. The connecting member 25 includes a horizontal slot 27 having on its front end an inclined locking slot portion 27'. The slide 36 is connected to the connecting member 25 through a pin 28 attached to the slide 36 and slidably engaging in the slot 27. In this embodiment, the locking mechanism 24 comprises two rotatable locking arms 29 coupled by pins 28 and 32, wherein pin 28 also acts as a pivot shaft of the two locking arms 29 of the locking mechanism 24, and wherein the locking pin 32 engages in the slot 27. The locking arms 29 have on their end remote from the pin 28 a downwardly protruding locking cam 30 adapted to cooperate with a locking recess 31 in the guide section 6. Due to the symmetrical structure and connection of the locking mechanism by the two parallel locking arms 29 on either side of the connecting member 25 the force on the locking mechanism 24 will always be exerted symmetrically.

The slide 36 of the drain channel operating mechanism 10 further comprises a spring 33 adapted to engage under the drain channel extension 12 in order to exert an upward pressure on the drain channel 11.

The operation of the drain channel operating mechanism 10 is as follows.

When the closure 4 is in a position between the closed position and the venting position, the drain channel operating mechanism 10 is in the position according to FIG. 2. When the drive cable 7 moves in order to move the closure 4 between the closed and venting positions, the curve slide 16 is moved along. Since in these positions the drain channel 11 should be kept stationary, the curve slide 16 and the drain channel support member 14 are allowed to move relatively to each other through the engagement of the slide pin 14 in the guide curve 15. Due to the horizontal extent of the curve 15, there is no vertical movement of the drain channel 11. The horizontal position of the drain channel 11 is maintained as a result of the engagement of the guide pin 19 of the horizontal support member 18 in the vertical slot 20 of the slide member 21. The slide 36 is kept in a locked position with respect to the guide section 6 by means of the locking mechanism 24. The locking cams 30 of the locking mechanism 24 are kept in engagement with the locking recess 31 in the guide section 6 by means of the engagement of the locking pin 32 in the horizontal slot 27.

FIG. 2 shows the operating mechanism in a position corresponding to the closed position of the closure 4 just before it is starting to move downwardly. If the drive cable 7 is then moved further backwardly to move the closure 4 downwardly to a position in which it is able to slide backwardly below the fixed roof 1, the slide pin 14 of the support member 13 runs through the inclined section 15" of the guide curve 15 in the curve slide 16, thereby moving the drain channel 11 downwardly together with the closure 4. The locked slide 36 keeps the drain channel 11 in a fixed horizontal position.

When the slide pin 14 has reached the front section 15' of the guide curve 15, the drain channel 11 and the closure 4 have reached their lowest position and the closure 4 will start its rearward movement. When the closure 4 is slid rearwardly, the curve slide 9 of the closure operating mechanism 5 is coupled as a unit with the drive cable 7 so that they move with the same speed in rearward direction. Thus, the parts 23 of the closure operating mechanism 5 are sliding rearwardly and take along the connecting member 25 of the lost motion device 22. As the slide 36 is still locked wits respect to the guide section 6, the pin 28 is kept stationary and the horizontal slot 27 slides with respect to this pin 28.

As the closure 4 is moved rearwardly and the drain channel 11 is maintained stationary, the closure 4 moves with respect to the drain channel 11 until the locking pin 32 arrives at the inclined locking slot portion 27'.

When the drive cable 7 and therefore the connecting member 25 is moved further rearwardly, the locking pin 32 is forced to move into the inclined locking slot portion 27' and therefore it will move upwardly to the upward end of the inclined locking slot portion 27'. During this upward movement of the locking pin 32, the locking arms 29 are rotated around the pin 28 and the locking cams 30 are moved along with the locking pin 32 and are moved out of the locking recess 31. When the locking cams 30 are moved completely out of the locking recess 31, a further rearward movement of the drive cable 7 will cause the connecting member 25 to push the locking pin 32 (locked in the upward closed end of the locking slot portion 27') rearwardly thereby taking along the slide 36 and consequently the horizontal support member 18, the drain channel extension 12 and drain channel 11. From this moment on, the closure 4, the closure operating mechanism 5, the drain channel operating mechanism 10 and the drain channel 11 will move as a unit in a sliding motion to the open position of the closure 4 below fixed roof 1.

When the locking cams 30 are moved out of the locking recess 31, the locking cams 30 will rest on the bottom of the guide section 6. As a result, they can not be moved downwardly again and thus the locking pin 32 will be locked in the inclined locking slot portion 27'. Therefore it will act as a locking mechanism between the slide 36 and the curve slide 9 of the closure operating mechanism 5.

Due to the relative sliding movements between the closure 4 and the drain channel 11, the drain channel 11 can be moved such that it does not protrude beyond the rearward end of the closure 4 and therefore room is saved at the rear end of the frame 3. No space has to be available for accommodating the protruding drain channel 11 when the closure 4 is in its completely open position.

Upon displacement of the closure 4 back to the closed position in the roof opening 2, cable 7 is moved in forward direction and all parts move as a unit until the drain channel 11 has arrived at its front position. The locking cams 30 have then arrived above the locking recess 31 and are urged into the locking recess 31 when the connecting member 25 is moved further forwardly and the drain channel 11 cannot follow the forward movement anymore. The locking mechanism 24 will then change again from means locking the slide 36 to the closure operating mechanism 5 into means for locking the slide 36 to the guide section 6. The lost motion device 22 then comes into operation again and the closure 4 is moved forwardly relative to the drain channel 11. When the closure 4 has arrived in its front position, it is moved upwardly again to the closed position and the drain channel 11 will follow this upward movement by the displacement of the slide pin 14 of the support member 13 in the inclined section 15" is of the guide curve 15. The spring 33 will assist in moving the drain channel 11 upwardly to its upward position wherein the slide pin 14 of the support member 13 is supported in the upper rear section 15'" of the guide curve 15 in the curve slide 16.

From the forgoing it is clear that the invention provides a drain channel operating mechanism enabling a relative movement between the drain channel and the closure, in particular in sliding direction.

The invention is not restricted to the embodiment shown in the drawing and described herein before, which may be varied in different manners within the scope of the invention. For example, it is conceivable to construct the drain channel operating mechanism such that the drain channel is moved relative to the closure, for example when it is in its forward (closed) position. In that case, the drain channel will be moved in a forward direction before the closure is moved backwardly of course a simultaneous movement would also be possible.

Although the present invention has been described with reference to preferred embodiments, workers skilled in the art will recognize that changes may be made in form and detail without departing from the spirit and scope of the invention.

What is claimed is:

1. An open roof construction for a vehicle having a roof opening in its fixed roof, comprising a frame including longitudinal guide sections positionable on either side of the roof opening, a closure moveable at least between a closed position adapted to close the roof opening and an open position in which the closure is slid under the fixed roof and at least partially opening the roof opening, a closure operating mechanism for moving said closure, a driving member for driving said closure operating mechanism, a drain channel positionable under the rear edge of the roof opening at least in a closed position of the closure, and a drain channel operating mechanism adapted to move said drain channel in the opening direction of the closure, and wherein said drain channel operating mechanism is adapted so as to cause a relative movement between the drain channel and the closure during at least a part of the sliding movement of the closure, wherein said closure operating mechanism is connected to said drain channel operating mechanism by a lost motion device, wherein the lost motion device enables the horizontal sliding movement of the drain channel operating mechanism relatively to the longitudinal guide sections of the frame and enables the relative movement of the closure and the drain channel, wherein said lost motion device comprises a connecting member including a slot with an inclined locking portion, and wherein said drain channel operating mechanism includes a locking mechanism that includes a pin guided by the slot, such that when the pin is not in the inclined locking portion the locking mechanism is locked and the closure moves relative to the drain channel, and such that when the pin is in the inclined locking portion, the locking mechanism has been unlocked and the closure and the drain channel have been locked relative to each other.

2. The open roof construction according to claim 1, wherein said drain channel operating mechanism comprises a locking mechanism for locking the horizontal sliding movement of the drain channel relative to the guide sections when the lost motion device is operative.

3. The open roof construction according to claim 1, wherein said locking mechanism comprises a cam configured to engage in a recess in the longitudinal guide sections when the locking mechanism is in the locked position.

4. An open roof construction for a vehicle having a roof opening in its fixed roof, comprising a frame including longitudinal guide sections positionable on either side of the roof opening; a closure moveable at least between a closed position adapted to close the roof opening and an open position in which the closure is slid under the fixed roof and at least partially opening the roof opening, a closure operating mechanism for moving said closure, a driving member for driving said closure operating mechanism, a drain channel positionable under the rear edge of the roof opening at least in a closed position of the closure, and a drain channel operating mechanism adapted to move said drain channel in the opening direction of the closure, and wherein said drain channel operating mechanism is adapted so as to cause a relative movement between the drain channel and the closure during at least a part of the sliding movement of the closure wherein said closure is moveable downwardly from the closed position in order to be slid to the open position, and said drain channel is supported by a support member which is guided by a guide curve in a curve slide coupled to the driving mechanism of said closure operating mechanism, wherein said guide curve comprises an inclined section in order to move the drain channel in vertical direction when the closure is moved downwardly.

5. The open roof construction according to claim 4, wherein said support member, which is connected to said drain channel, is guided by said guide curve by a pin which is connected to said support member and guided by said guide curve.

6. The open roof construction according to claim 4, wherein said drain channel operating mechanism comprises a substantially vertical slot which is provided in a slide member that is coupled with the locking mechanism, and a pin which is connected with the drain channel support member, in order to enable the vertical movement of the drain channel and to control the horizontal movement thereof.

7. The open roof construction according to claim 5, wherein the drain channel operating mechanism comprises a spring member biasing the drain channel in upward direction.

8. Method of operating an open roof construction for a vehicle having a roof opening in its fixed roof, comprising:
moving a closure at least between a closed position adapted to close the roof opening and an open position in which the closure is slid under the fixed roof and at least partially opening the roof opening; positioning a drain channel under the rear edge of the roof opening at least in a closed position of the closure;
causing a relative movement between the drain channel and the closure during a part of the sliding movement of the closure; and
causing a locked coupling between the drain channel and the closure during the remaining part of the sliding movement of the closure such that the drain channel follows all sliding movements of the closure.

9. The method according to claim 8, wherein the drain channel is kept substantially stationary during a part of the rearward movement of the closure from the closed position to the open position.

10. The method according to claim 9, wherein the drain channel is kept substantially stationary during a first part of the rearward movement of the closure from the closed position to the open position.

11. An open roof construction for a vehicle having a roof opening in its fixed roof, comprising a frame including longitudinal guide sections positionable on either side of the roof opening; a closure moveable at least between a closed position adapted to close the roof opening and an open position in which the closure is slid under the fixed roof and at least partially opening the roof opening, a closure operating mechanisin for moving said closure, a driving member for driving said closure operating mechanism, a drain channel positionable under the rear edge of the roof opening at least in a closed position of the closure, and a drain channel operating mechanism adapted to move said drain channel in the opening direction of the closure, and wherein said drain channel operating mechanism is connected to said closure operating mechanism through a lost motion device so as to cause a relative movement between the drain channel and the closure during at least a part of the sliding movement of the closure, said drain channel operating mechanism comprising a locking mechanism for locking the horizontal sliding movement of the drain channel relative to the guide sections when the lost motion device is operative, and a coupling for coupling the drain channel operating mechanism to the closure operating mechanism to form a locked unit when the drain channel is unlocked with respect to the longitudinal guide sections.

* * * * *

UNITED STATES PATENT AND TRADEMARK OFFICE
CERTIFICATE OF CORRECTION

PATENT NO. : 6,942,283 B2  Page 1 of 1
APPLICATION NO. : 10/755697
DATED : September 13, 2005
INVENTOR(S) : Wilms It is certified that error appears in the above-identified patent and that said Letters Patent is hereby corrected as shown below:

At Col. 6, Line 57 please insert the following claim that was inadvertently omitted as claim 4:
--The open roof construction according to claim 3, wherein said cam of said locking mechanism and said pin guided by the slot of the connecting member are provided on a vertically moveable part.--

Renumber Claims 4-11 to 4-12.

Signed and Sealed this

Fourth Day of March, 2008

JON W. DUDAS
*Director of the United States Patent and Trademark Office*